(12) United States Patent
Bohner et al.

(10) Patent No.: US 6,279,673 B1
(45) Date of Patent: Aug. 28, 2001

(54) STEERING SYSTEM FOR A VEHICLE EQUIPPED WITH A TRAFFIC-LANE FOLLOWING DEVICE

(75) Inventors: Hubert Bohner, Boeblingen; Martin Moser, Fellbach; Wolfgang Schrock, Esslingen, all of (DE)

(73) Assignee: DaimlerChrysler A.G., Stuttgart (DE)

( * ) Notice: Subject to any disclaimer, the term of this patent is extended or adjusted under 35 U.S.C. 154(b) by 0 days.

(21) Appl. No.: 09/376,531

(22) Filed: Aug. 18, 1999

(30) Foreign Application Priority Data

Aug. 18, 1998 (DE) ............................................... 198 37 340

(51) Int. Cl.$^7$ ....................................................... B62D 5/06
(52) U.S. Cl. ............................................. 180/167; 180/417
(58) Field of Search ..................................... 180/417, 421, 180/422, 442, 443, 446, 167, 168, 403, 402; 701/41, 42, 44

(56) References Cited

U.S. PATENT DOCUMENTS

| | | | |
|---|---|---|---|
| 4,509,611 | * 4/1985 | Kade et al. | 180/446 |
| 5,236,335 | * 8/1993 | Takeuchi | 180/79.1 |
| 5,373,911 | * 12/1994 | Yasui | 180/168 |
| 5,862,878 | * 1/1999 | Bohner et al. | 180/403 |
| 5,893,427 | * 4/1999 | Bohner et al. | 180/403 |
| 5,913,375 | * 6/1999 | Nishikawa | 180/168 |
| 6,050,359 | * 4/2000 | Mouri et al. | 180/415 |
| 6,053,270 | * 4/2000 | Nishikawa et al. | 180/168 |
| 6,076,626 | * 6/2000 | Bohner et al. | 180/402 |
| 6,092,618 | * 7/2000 | Collier-Hallman | 180/422 |
| 6,138,788 | * 10/2000 | Bohner et al. | 180/405 |

FOREIGN PATENT DOCUMENTS

| | | |
|---|---|---|
| 4025697 | 8/1990 | (DE) . |
| 19540956 | 11/1995 | (DE) . |
| 19645404 | 11/1996 | (DE) . |
| 63-20261 | 1/1988 | (JP) . |
| 63-164081 | 10/1988 | (JP) . |
| 8-276857 | 10/1996 | (JP) . |
| 9-254803 | 9/1997 | (JP) . |

* cited by examiner

Primary Examiner—Robert P. Olszewski
Assistant Examiner—Michael Cuff
(74) Attorney, Agent, or Firm—Crowell & Moring, L.L.P.

(57) ABSTRACT

In order to allow a traffic-lane following device in a vehicle to be used at relatively high vehicle speeds, a steering system is provided with a steering handle and a steering run which couples the steering handle to vehicle steered wheels. A servomotor is coupled to the steering run. A servovalve is arranged in the steering run and has a first control part (which is associated with a section on the steering handle side of the steering run) as well as a second control part (which is associated with a section on the vehicle steered wheel side of the steering run) to operate the servomotor as a function of relative movements between the control parts. An actuating drive is coupled to the section on the steering handle side of the steering run and is used to produce a steering force. A regulating and control arrangement uses a sensor system to determine required steering angle values which allow a traffic lane to be followed and uses a steering angle sensor to determine actual steering angle values. The actuating drive is operated as a function of a comparison of the required and actual steering angles, in which the steering angle sensor interacts with the section on the vehicle steered wheel side of the steering run.

18 Claims, 1 Drawing Sheet

STEERING SYSTEM FOR A VEHICLE EQUIPPED WITH A TRAFFIC-LANE FOLLOWING DEVICE

BACKGROUND OF THE INVENTION

This application claims the priority of 198 37 340.6-21, filed Aug. 18, 1998, the disclosure of which is expressly incorporated by reference herein.

The present invention relates to a steering system in a vehicle which is equipped with a traffic-lane following device, and more particularly to a steering system having a steering handle, for example a steering hand wheel, for introducing a manual steering force into the steering system. A mechanical steering run mechanically couples the steering handle to the steerable vehicle wheels, and a servomotor is coupled to the steering run in order to operate the steering of the vehicle steered wheels. A servovalve is arranged in the steering run and has a first control part (which is associated with a section on the steering handle side of the steering run) as well as a second control part(which is associated with a section on the vehicle steered wheel side of the steering run. The servovalve operates the servomotor as a function of the relative movements between the control parts. An actuating drive, is coupled to the section on the steering handle side of the steering run for introducing a mechanical steering force into the steering system. A regulating and control arrangement which uses a sensor system to determine a required steering angle value which allows the vehicle to follow a predetermined traffic lane, determines an actual steering angle value by way of a steering angle sensor and operates the actuating drive as a function of a comparison of the required and actual values of the steering angles in order to introduce a steering force.

A conventional servo-assisted steering system has a steering handle, for example a steering hand wheel, with which the driver manually introduces a steering force into the steering system. The steering handle is connected to a mechanical steering run, which couples the steering handle to steerable vehicle wheels. The servo-assisted steering system also has a servovalve which is normally arranged in the steering run and has a first control part on the input side and a second control part on the output side.

The servovalve in the known system separates a section on the steering handle side in the steering run, which is coupled to the first control part, on the input side, from a section on the vehicle steered wheel side, which is coupled to the second control part, on the output side. Relative movements, in particular relative rotations, between the control parts of the servovalve then operate a servomotor, which is coupled to the section on the vehicle steered wheel side of the steering run, and thus to the vehicle steered wheels. If the servomotor is a hydraulic motor, hydraulic fluid pressure is applied in an appropriate manner to the servomotor via the servovalve.

In order to avoid any small steering forces on the steering handle from leading to a movement of the control parts in the servovalve and thus to steering angle changes on the wheels, the control parts of the servovalve are coupled to one another via a spring system, in particular via a torsion rod or a C spring. Thereby, the spring system prestresses the control parts to a normal position. In order that the driver can input a steering command into the steering system, the driver must accordingly manually apply a steering force to overcome the restoring force of the spring system in the servovalve. This measure is also used, in particular, to give the driver a sensation of the forces acting on the vehicle steered wheels in order to improve driving safety.

Modern vehicles may be equipped with a traffic-lane following device. Such a traffic-lane following device may, for example, generate required steering angle values with an appropriate sensor system. Such values, when they are applied to the vehicle steered wheels, allow the vehicle to follow a predetermined traffic lane. For example, the traffic-lane following device may be equipped with a camera which detects, for example, a strip on the side of the roadway and produces required steering angle values as a function of the profile of this side strip.

In order for the vehicle to automatically adopt and maintain the required steering angle value via the traffic-lane following device, the steering system with such a traffic-lane following device has an actuating drive which is coupled to the section on the steering handle side of the steering run and introduces steering forces in order to set the desired steering angle in the steering run. The mechanical steering force produced by the actuating drive thereby supports or replaces the manual steering force applied by the driver during normal operation, or even counteracts it. Depending on the safety philosophy adopted by the vehicle manufacturer, the driver can even remove his or her hands from the steering handle when in the traffic-lane following mode.

In order to regulate and control the actuating drive, a regulating and control arrangement uses signals generated by the sensor system of the traffic-lane following device to determine a required steering angle value and also uses a steering angle sensor to determine an actual steering angle value. The regulating and control arrangement then carries out a comparison of the required and actual values of the steering angle and operates the actuating drive in an appropriate manner in order to introduce into the steering system or into the steering run the steering force which is required to achieve the desired steering angle.

In conventional steering systems, the steering angle sensor which is used to detect the actual steering angle value is arranged in the section on the steering handle side of the steering run, that is in hydraulic servo-assisted steering, between the steering handle and the hydraulic servovalve, and in electrical servo-assisted steering, between the steering handle and the electrical servovalve (e.g., an elastic torque sensor). If, however, there is any relative movement between the control parts of the servovalve, the steering angle set on the steering handle does not match the steering angle which is present at the vehicle steered wheels.

Furthermore, in hydraulically operating servo-assisted steering systems, friction can occur in the servovalve and in the section on the steering handle side of the steering run as well as, in particular, in a gearbox which couples the actuating drive to the steering run. Disturbances are thus caused in the control of the wheel angle setting. Discrepancies between the steering angle of the steering handle and the steering angle of the vehicle steered wheels thus result in an increased control requirement as a result of which, on one hand, the control time is increased and, on the other hand, oscillations are more likely in the control system. In order to allow a predetermined traffic lane to be followed even at relatively high vehicle speeds, the required steering angle values must, however, be set and maintained as exactly and quickly as possible. The known steering systems can thus be used only at relatively low vehicle speeds for the purposes of a traffic-lane following device.

SUMMARY OF THE INVENTION

An object of the present invention is to provide an improved steering system for a vehicle having a traffic-lane following device, such that the traffic-lane following device can also be used at higher vehicle speeds.

This object has been achieved, according to the invention, by a steering system in which the steering angle sensor for detecting the actual steering angle value interacts with the section on the vehicle steered wheel side of the steering run.

The invention is based on the recognition of the advantage of tapping off of the actual steering angle value directly at the vehicle steered wheels or on a component which moves with the vehicle steered wheels, with a defined proportionality factor or as a function of a corresponding, parameter-dependent family of characteristics. This tapping off is achieved according to the invention in that the steering angle sensor which detects the actual steering angle value is assigned to the section on the vehicle steered wheel side of the steering run.

Corruptions of the actual steering angle value resulting from control part discrepancies from their normal position or from friction in the steering valve or in the section on the steering handle side of the steering run cannot occur with the present invention. In the same way, impacts from the side against the steered vehicle wheels, resulting, for example, from potholes or grooves in the roadway, are detected directly as an angle change. As a result, the desired required steering angle value can be set quickly and exactly. The steering system designed according to the invention is thus suitable for use in a traffic-lane following device at relatively high vehicle speeds as well.

BRIEF DESCRIPTION OF THE DRAWINGS

Other objects, advantages and novel features of the present invention will become apparent from the following detailed description of the invention when considered in conjunction with the accompanying drawing in which:

The sole FIGURE is a schematic illustration of a steering system according to the present invention.

DETAILED DESCRIPTION OF THE DRAWINGS

Figure 1:
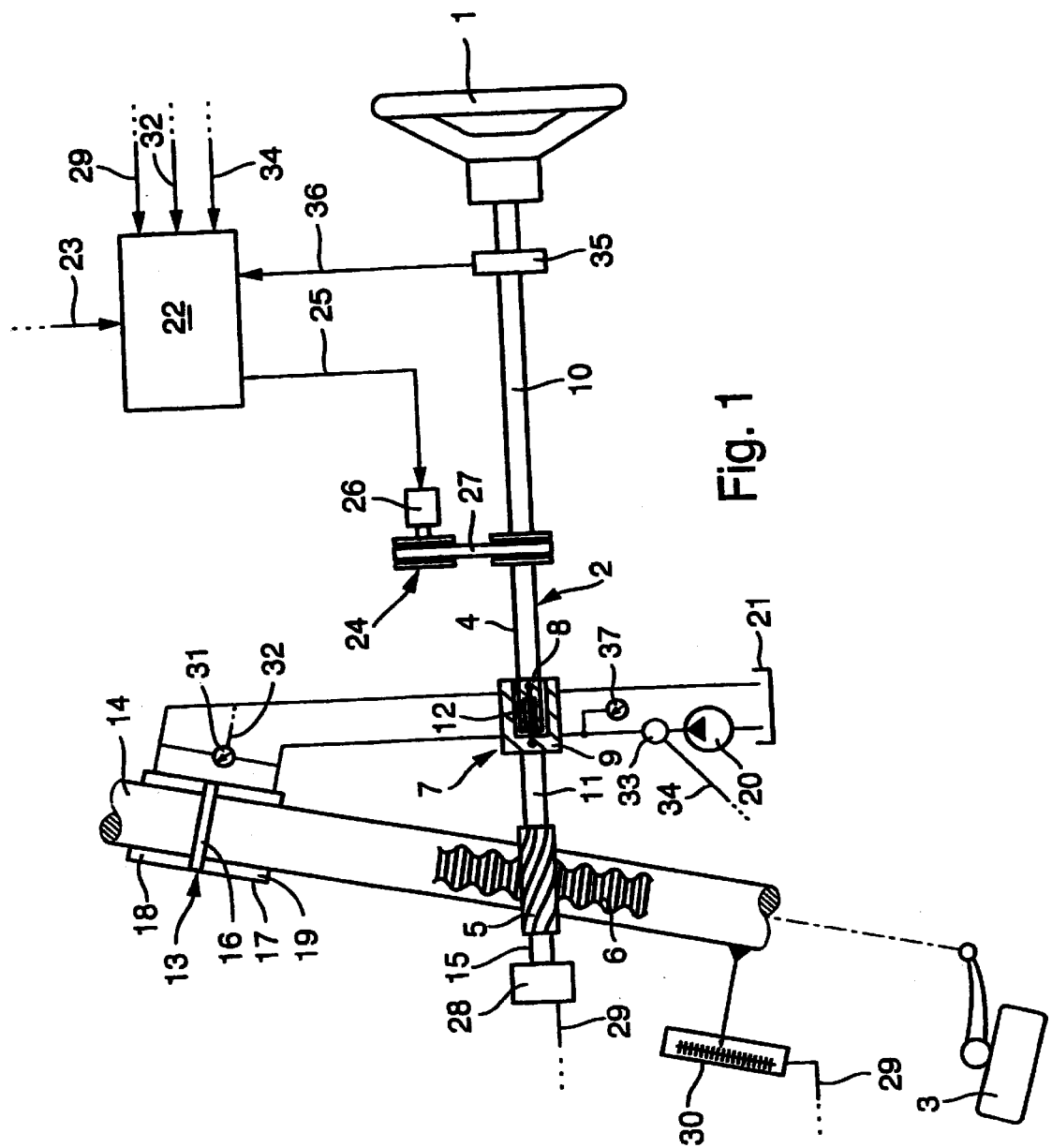

As shown in the FIGURE, a steering system according to the invention has a steering handle in the form of a steering wheel 1 which is operated manually by the vehicle driver. The steering handle 1 is connected to a mechanical steering run or column 2 so that they rotate together, via which steering run 2, the steering handle 1 is coupled to steerable vehicle wheels 3, of which only one need be illustrated.

The steering run 2 has a steering rod 4 at one end of which the steering wheel 1 is fitted and at the other end of which a pinion 5 is fitted. The pinion 5 engages with a toothed rack 6 which, for its part, is coupled to the vehicle steered wheels 3. A servovalve 7 in the form of a rotating slide valve is arranged in the steering rod 4 of the steering run 2 and has a first control part 8 and a second control part 9 which are mounted such that they can rotate relative to one another. The first control part 8 (which is associated with the input side of the servovalve 7) is connected to a section 10 on the steering wheel side (i.e., associated with the steering wheel) of the steering rod 4, such that they rotate together, or of the steering run 2. In contrast, the second control part 9, which is associated with the output side of the servovalve 7, is connected to and rotates together with a section 11 on the vehicle steered wheel side (i.e., associated with the vehicle steered wheels 3) of the steering rod 4 or of the steering run 2. In this way, the servovalve 7 subdivides the steering run 2 or the steering rod 4 into a section 10 on the steering handle side and a section 11 on the vehicle steered wheel side.

The control parts 8, 9 of the servovalve 7 are each connected, such that they rotate together, to a torsion rod 12 which biases or tends to move these parts into a normal position relative to one another. In the event of any relative rotation away from this normal position between the control parts 8, 9, a hydraulic servomotor 13 is operated, which is hydraulically coupled to the control valve 7. This servomotor 13 is a piston and cylinder unit and is coupled directly to the toothed rack 6 via a piston rod 14. A piston 16 is arranged on the piston rod 14 and, in a cylinder 17, axially separates a first chamber 18 from a second chamber 19.

A rotary movement to a greater or lesser extent between the control parts 8, 9 of the servovalve 7 results in the pressure side of a hydraulic fluid pump 20 (whose suction side communicates with a hydraulic fluid reservoir 21) being connected to a greater or lesser extent to one chamber 18 or the other 19 of the servomotor 13, while the respective other chamber 18 or 19 is connected via the servovalve 7 to the hydraulic fluid reservoir 21. Depending on the pressure difference between the chambers 18 or 19, the piston rod 14 and thus the toothed rack 6 are moved in one direction or the other, resulting in a corresponding change in the steering angle at the vehicle steered wheels 3.

The illustrated steering system also has a control and regulating arrangement 22 of a traffic-lane following device. Via an input 23, this regulating and control arrangement 22 receives information about a traffic lane which is to be driven along. The control and regulating arrangement 22 uses this information to determine the required steering angle values which must be set at the vehicle steered wheels 3 to allow the vehicle to follow the desired traffic lane. With the aid of actual steering angle values, the control and regulating arrangement 22 carries out required/actual value comparisons which are used to determine control variables for an actuating drive 24. The control variables are signaled to the actuating drive 24 via an appropriate control line 25.

The actuating drive 24 has, for example, an electric motor 26 which is coupled via a gearbox 27 to the section 10 on the steering handle side of the steering run 2, and can introduce a mechanical steering force there. When the traffic-lane following device is activated, the actuating drive 24 produces a steering force in the section 10 on the steering handle side of the steering run 2 and, as a result, produces a relative movement between the control parts 8, 9 of the control valve 7. This results in corresponding operation of the servomotor 13 and, finally, produces the desired steering angle setting at the vehicle steered wheels 3. In this case, the actuating drive 14 can either merely assist manual steering operations by the driver via the steering handle 1, or else can completely replace manual steering operation.

In accordance with a first embodiment, an angle measurement sensor 28 determines the current actual steering angle value and is connected to, so as to rotate together with, a part 15 of the steering rod 4 which is associated with the output side of the servovalve 7, and with the second control part 9. In this way, an angle measurement signal generated by the angle measurement sensor 28 is correlated with the steering angle that is present at the vehicle steered wheels 3. The signal value which correlates with the actual steering angle value is supplied via an appropriate signal line 29 to the regulating and control arrangement 22.

In accordance with a second embodiment, a movement measurement sensor 30 determines the actual steering angle. The sensor 30 is coupled to the toothed rack 6 and to the piston rod 14 to detect their movement. This movement measurement sensor 30 also generates a signal value which correlates with the actual steering angle of the vehicle steered wheels 3 and is supplied via an appropriate signal line 29 to the regulating and control arrangement 22.

The arrangement of the steering angle sensor (either the angle measurement sensor 28 or the movement measurement sensor 30) chosen according to the invention in the section 11 on the vehicle steered wheel side of the steering run 2 means that the steering angle detected by the sensor 28 or the sensor 30 corresponds, without any distortion, to the steering angle which is present at the vehicle steered wheels 3. This correspondence results from the components (toothed rack 6 and steering rod 4) at which the actual steering angle is tapped off being mechanically positively coupled to the vehicle steered wheels 3 such that the movements of these components (4 and 6) take place analogously to the movements of the vehicle steered wheels 3, with a defined proportionality factor being involved.

The detection of the actual steering angle of the vehicle steered wheels 3 in the arrangement of the steering angle sensor 28 or 30 according to the invention is to this extent decoupled from the possibly different present position of the steering wheel 1. A required steering angle value which is desired can thus be set and maintained particularly accurately and quickly. Consequently, the steering system according to the present invention is particularly suitable for operation of a traffic-lane following device at high vehicle speeds.

In a further embodiment of the steering system according to the invention, the control and regulating arrangement 22 may take account of additional parameters for the operation of the actuating drive 24. For example, the control and regulating arrangement 22 can use a pressure sensor 31 to determine the pressure difference between the chambers 18, 19 of the servomotor 13, whereby a signal value that correlates with this difference is received via a signal line 32. The control command for setting the required steering angle value which is desired can then be matched to the pressure ratios that are present in the servomotor 13. As a result, the required steering angle which is desired can be achieved, in particular, without any control overshoots.

In accordance with another advantageous embodiment, the viscosity of the hydraulic fluid which varies as a function of the temperature is taken into account. For example, a temperature measurement sensor 33 is connected on the pressure side of the hydraulic fluid pump 20. The temperature of the hydraulic fluid is thus measured and a signal value, which correlates with the temperature, is signaled, via a signal line 34, to the regulating and control arrangement 22. In order to ensure that the piston rod 14 of the servomotor 13 moves at the same speed at different hydraulic fluid temperatures and thus that the highly dynamic movements for the vehicle steered wheels 3 are exact, the relative movements between the control parts 8, 9 of the servovalve 7 can be matched to the viscosity of the hydraulic fluid, which varies as a function of the hydraulic fluid temperature.

In a further development of the steering system, a second steering angle sensor 35 is arranged on the section 10 on the steering wheel side. The sensor 35 is connected via a signal line 36 to the regulating and control circuit 22 and detects the steering angle of the steering wheel 1. A comparison of the values of the second steering angle sensor 35 and of the first steering angle sensor 28 or 30 allows exact determination of the deflection of the steering parts 8, 9 of the servovalve 7. On one hand, the control of the servovalve 7 is thus improved. On the other hand, the torque which is present at the servovalve 7 or is present in the steering run 2 can be determined and checked.

Furthermore, a pressure sensor 37 can be connected to the pressure side of the hydraulic fluid pump 20. Its measurement signals are transmitted to the control and regulating arrangement 22. The control or regulation of the servomotor 13 can then be influenced as a function of this hydraulic pressure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering system in a vehicle equipped with a traffic-lane following device, comprising a steering device for introducing a manual steering force into the steering system; a mechanical steering run for mechanically coupling the steering device to steerable vehicle wheels; a servomotor operatively coupled to the steering run to operate steering of the vehicle steered wheels; a servovalve arranged in the steering run and having a first control part associated with a first section on a steering device side of the steering run and a second control part associated with a second section on a vehicle steered wheel side of the steering run, the servovalve being arranged to operate the servomotor as a function of relative movements between the control parts; an actuating drive operatively coupled to the section on the steering device side of the steering run for introducing a mechanical steering force; and a regulating and control arrangement comprising a sensor system to determine a required steering angle value to allow the vehicle to follow a predetermined traffic lane, to determine an actual steering angle value by way of a steering angle sensor and to operate the actuating drive as a function of a comparison of required and actual values of the steering angles to introduce a steering force, wherein the steering angle sensor for detecting the actual steering angle value interacts with the section on the vehicle steered wheel side of the steering run.

2. The steering system according to claim 1, wherein the steering angle sensor is an angle measurement sensor arranged to be operated by an element of the section on the vehicle steered wheel side of the steering run which rotates with changes in the steering angle of the vehicle steering wheels.

3. The steering system according to claim 1, wherein the steering angle sensor is a movement measurement sensor arranged to be operated by an element of the section on the vehicle steered wheel side of the steering run, the movement measurement sensor being configured to move substantially linearly with changes in the steering angle of the vehicle steered wheels.

4. The steering system according to claim 1, wherein a pressure measurement sensor is arranged in the system to determine a pressure difference between two motor lines for permitting the servovalve to operate the servomotor.

5. The steering system according to claim 2, wherein a pressure measurement sensor is arranged in the system to determine a pressure difference between two motor lines for permitting the servovalve to operate the servomotor.

6. The steering system according to claim 3, wherein a pressure measurement sensor is arranged in the system to determine a pressure difference between two motor lines for permitting the servovalve to operate the servomotor.

7. The steering system according to claim 4, wherein a pressure measurement sensor is arranged in the system to determine hydraulic pressure of a hydraulic fluid pump arranged to supply the servovalve with hydraulic pressure to operate the servomotor, such that the hydraulic pressure is taken into account by the regulating and control arrangement for operation of the servomotor.

8. The steering system according to claim 1, wherein a temperature measurement sensor is arranged in the system to determine temperature of the hydraulic fluid.

9. The steering system according to claim 2, wherein a temperature measurement sensor is arranged in the system to determine temperature of the hydraulic fluid.

10. The steering system according to claim 3, wherein a temperature measurement sensor is arranged in the system to determine temperature of the hydraulic fluid.

11. The steering system according to claim 4, wherein a temperature measurement sensor is arranged in the system to determine temperature of the hydraulic fluid.

12. The steering system according to claim 7, wherein a temperature measurement sensor is arranged in the system to determine temperature of the hydraulic fluid.

13. The steering system according to claim 1, wherein a second steering angle sensor is arranged in the system to determine the steering angle of the steering device, whereby a difference between steering angle values of the first steering angle sensor and of the second steering angle sensor are used to at least one of the actuating drive and to determine torque in the steering run.

14. The steering system according to claim 2, wherein a second steering angle sensor is arranged in the system to determine the steering angle of the steering device, whereby a difference between steering angle values of the first steering angle sensor and of the second steering angle sensor are used to at least one of the actuating drive and to determine torque in the steering run.

15. The steering system according to claim 3, wherein a second steering angle sensor is arranged in the system to determine the steering angle of the steering device, whereby a difference between steering angle values of the first steering angle sensor and of the second steering angle sensor are used to at least one of the actuating drive and to determine torque in the steering run.

16. The steering system according to claim 4, wherein a second steering angle sensor is arranged in the system to determine the steering angle of the steering device, whereby a difference between steering angle values of the first steering angle sensor and of the second steering angle sensor are used to at least one of the actuating drive and to determine torque in the steering run.

17. The steering system according to claim 7, wherein a second steering angle sensor is arranged in the system to determine the steering angle of the steering device, whereby a difference between steering angle values of the first steering angle sensor and of the second steering angle sensor are used to at least one of the actuating drive and to determine torque in the steering run.

18. The steering system according to claim 8, wherein a second steering angle sensor is arranged in the system to determine the steering angle of the steering device, whereby a difference between steering angle values of the first steering angle sensor and of the second steering angle sensor are used to at least one of the actuating drive and to determine torque in the steering run.

* * * * *